S. F. Estell,
Cage Trap,
No. 81,265. Patented Aug. 18, 1868.

Witnesses,
B. F. Deal,
A. Roberts.

Inventor,
Samuel F. Estell,
By Joseph Ridge,
his atty.

UNITED STATES PATENT OFFICE.

SAMUEL F. ESTELL, OF RICHMOND, INDIANA.

IMPROVED ANIMAL-TRAP.

Specification forming part of Letters Patent No. 81,265, dated August 18, 1868.

*To all whom it may concern:*

Be it known that I, SAMUEL F. ESTELL, of the city of Richmond and State of Indiana, have invented a new and useful Improvement in Self-Setting Animal-Traps; and I do hereby declare that the following is a full, clear, and exact description thereof, reference being had to the accompanying drawings, in which—

Figure 1:
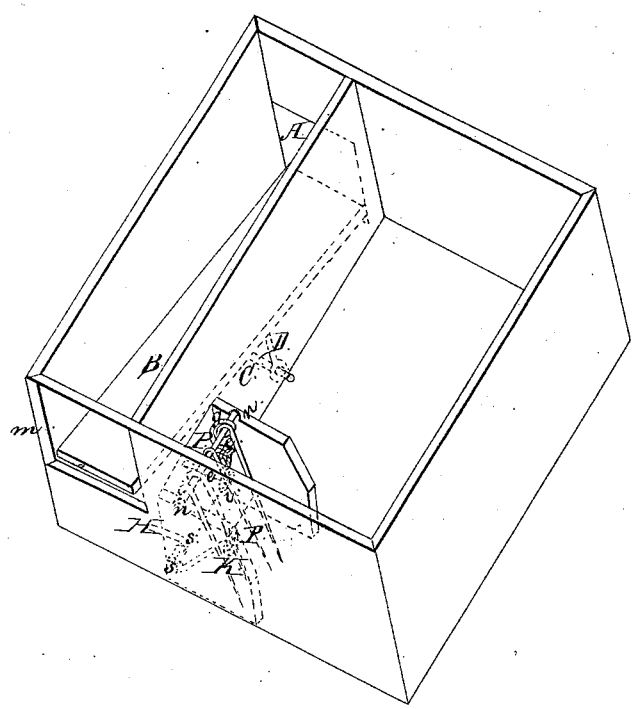
Figure 2:
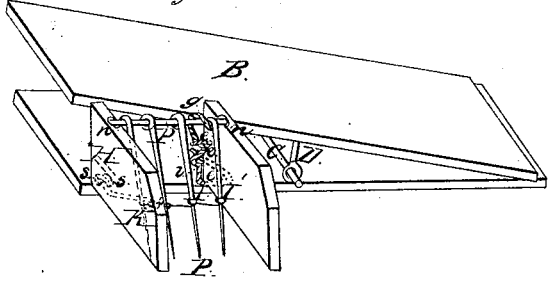

Figure 1 is a horizontal section; and Fig. 2, a detached view, showing the tilting platform and gate, and their relation one with the other.

The same letters in the different figures refer to corresponding parts of the invention.

To enable others skilled in the art to make and use my invention, I will proceed to describe its construction and operation.

B represents the tilting-platform, supported near the center on the posts D, and pivoted with rod C on the bottom of the box.

The animal enters the apartment of the trap in which the tilting platform is situated at the door, and, in passing over the platform, in order to procure the bait at the opposite end from which it enters, tilts said platform, with the end at door A up sufficiently to close said door. The platform is secured in this reversed position by means of a latch, e. The latter is hinged on the bottom of the trap by staples I and I, and is provided with a shoulder, t, under which the edge of the platform is caught and held down. The top of latch e is overbalanced in the direction of the platform by means of the lower end of the wire of which it is formed, which extends beneath the platform in the form of a latch, extending beneath the lever, which also serves to reverse the platform. The reversed position of the platform thus preventing retreat, the animal passes under gate P into the larger apartment.

The gate P is hinged at u u, and the animal, in passing under and raising the bottom of said gate, withdraws latch e from the platform by means of the trigger g, the latter being rigidly attached to the gate, and engaging with the top of latch e. The platform, being thus released, is again reversed by means of the greater weight of its front end, and the trap is again set. Should the prompt operation of the platform be prevented in consequence of any accumulation of dirt, the end of the latch e projecting beneath the said platform serves to reverse the latter as the gate is raised by the animal passing under the latter.

H is a lock for the purpose of securing gate P against any efforts of the animal in the second apartment from raising it and getting back into the platform-apartment, and is constructed as follows: The wire forming the latch or lock is hinged at S S to the bottom of the trap, and bent to form a fulcrum. One end of the wire projects beneath platform B, and the other end engages with gate P, and, being formed in a hook at the end, catches on a horizontal wire of said gate, thus locking the latter. The end of the lock engaging with the gate being heaviest, the lock is always operative, excepting when the end beneath the platform is depressed by the reversed position of said platform when tilted by the animal, thus letting the latter raise the gate and pass beneath.

The end m of the platform-apartment is covered with wire-cloth, thus admitting light to attract the animal in that direction.

Having thus fully described my said invention, what I claim, and desire to secure by Letters Patent, is—

1. The lever as formed by the end of latch e extending beneath platform B, by which the platform is raised by the action of gate P, substantially as specified.

2. The latch e, for holding the platform in its reversed position when operated by means of gate P, substantially as described, in combination with the lever e', that raises the platform simultaneously with the opening of the gate.

3. The lock H, for securing the gate when operated by the platform, as set forth.

SAMUEL F. ESTELL.

Witnesses:
JOSEPH RIDGE,
J. A. McMENNS.